Oct. 11, 1927.
T. STEIN
POWER PLANT
Filed Jan. 27, 1925
1,644,754
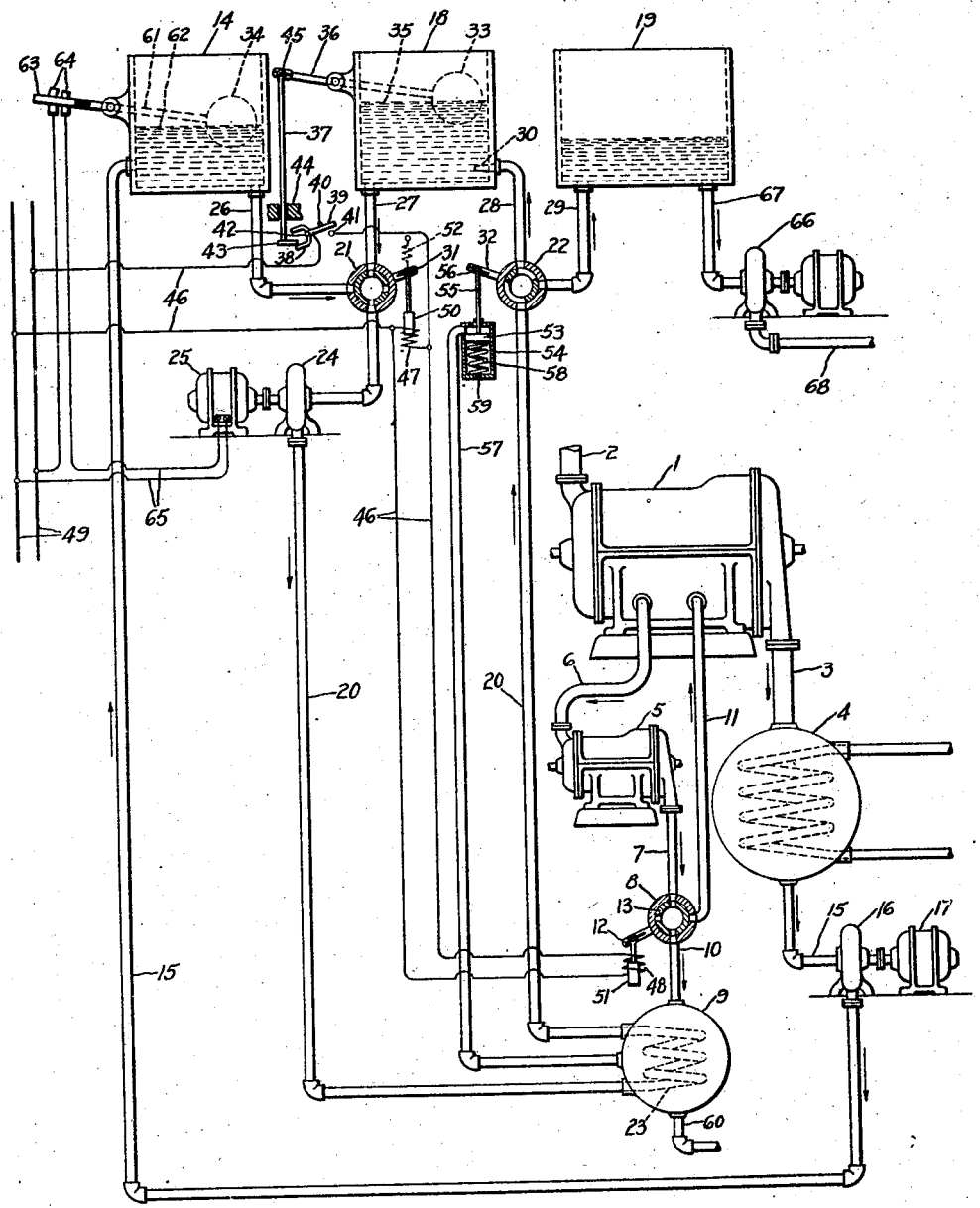
Inventor:
Theodor Stein,
by *Alexander S. [illegible]*
His Attorney.

Patented Oct. 11, 1927.

1,644,754

UNITED STATES PATENT OFFICE.

THEODOR STEIN, OF BERLIN, FRIEDENAU, GERMANY, ASSIGNOR, BY MESNE ASSIGNMENTS, TO GENERAL ELECTRIC COMPANY, OF SCHENECTADY, NEW YORK, A CORPORATION OF NEW YORK.

POWER PLANT.

Application filed January 27, 1925, Serial No. 5,060, and in Germany February 2, 1924.

The present invention relates to power plants and especially to an improved method of and arrangement for heating water, such as boiler feed water, by means of steam taken from an engine of the plant, after the manner set forth in my application, Serial No. 746,391, filed October 28, 1924.

In the above-named application, the heating method and system for carrying out the method provide for periodically storing a quantity of water, such as condensate from a condenser, heating the stored water in its totality by waste steam taken from a convenient source, such as a back-pressure turbine, and applied directly to it while stored, and then withdrawing the heated water, after which the storing and heating cycle is repeated.

This method of heating provides a constantly increasing counterpressure or back-pressure on the turbine supplying the heating steam and hence a constantly decreasing drop in heat, the increase in counterpressure being automatically produced by the corresponding increase in the condensation temperature of the steam. The condensation temperature constantly increases as the steam is supplied to the water because of the gradual heating of the water.

By this means a regenerative process of heating is obtained and is practically equivalent in result to gradually heating the water by means of steam drawn from an infinite number of taps or stages of a steam turbine.

The heating of the water is thus carried out at a high point in efficiency because the condensation temperature varies directly with the water temperature and differs from the latter temperature only by the unavoidable temperature drop necessary for the heat transmission.

It is the object of this invention to provide an improved heating method of this character and an improved heating system for carrying out such method wherein the condensate or water to be heated is automatically collected, stored, and more effectively and rapidly heated.

In accordance with the invention, the heating means is located outside the storage means, and the condensate or water to be preheated is collected, stored and then heated in its totality by circulation through the heating means while stored. By thus circulating the condensate it is possible to allow it to come into thermal contact with the heating medium at high speed and therefore to obtain good heat transmission.

The invention is herein described and illustrated, by way of example, in connection with a steam power plant installation embodying a main steam turbine provided with the usual condenser from which condensate to be preheated is taken, and an auxiliary steam turbine which is adapted to supply heating fluid for the condensate.

For a further consideration of what is believed to be novel and my invention, attention is now directed to the accompanying drawing, description thereof and the appended claims.

In the drawing, the figure is a diagrammatic view of a portion of a power plant installation embodying my invention with certain parts, such as valves, illustrated in section.

Referring to the drawing, 1 is a main steam turbine which is supplied with steam through a conduit 2 and which exhausts through a conduit 3 to a condenser 4 of any suitable construction. The turbine may be connected to drive any suitable load.

According to the embodiment of my invention illustrated in the drawing, I provide a back-pressure turbine 5 which receives steam from any suitable source, such as one of the intermediate stages of the main turbine 1, through a conduit connection 6 as indicated. This turbine may be connected to drive any suitable load, preferably one which it is permissible to let vary over a considerable range.

The exhaust end of the auxiliary turbine is connected by a conduit 7 with a selector valve 8 which in its normal position, as shown, connects said conduit with a preheater 9 through a conduit 10, and which in an alternate position connects said conduit with a low pressure stage of the main turbine through a conduit 11. The valve represents any valve means providing the above-described connections and having a control means, such as a lever 12, by which it is moved.

The valve illustrated comprises a perforated hollow cylinder 13 rotatable by the lever 12 to bring the perforations into registration with the conduit ends whereby they are connected through the hollow interior of the cylinder. The perforations are so spaced that in the position shown they register with conduits 7 and 10 while the cylinder body closes the end of conduit 11. To provide the alternate connection, the lever is moved upwardly until the perforations register with conduits 7 and 11 and the end of conduit 10 is closed. It will be seen that in the present example this requires approximately a 90 degree rotation of the cylinder 13 in a clockwise direction.

As a collecting means for the condensate or water to be heated, I provide a tank 14 and connect the inlet thereof with a suitable source of condensate such as the condenser 4 by a condensate delivery conduit 15, in which is located a suitable pump 16 driven by a motor 17. The motor represents any suitable means for continuously driving the pump. In a similar manner other sources of condensate may be connected with the collecting tank 14.

I further provide a circulating or storage tank 18, in connection with which the condensate is heated, and a delivery reservoir 19 for receiving the heated condensate prior to its utilization.

Storage tank 18, reservoir 19 and collecting tank 14 are interconnected through a circulating conduit or loop 20, connection to which is controlled by a suitable selector valve means, such as valves 21 and 22. The loop is connected between said valves and passes through the preheater 9 wherein it is enlarged in area by a coil 23 or other suitable means to provide good thermal contact with the heating medium.

A suitable condensate circulating pump 24 is connected into the loop 20 adjacent valve 21 to provide circulation of condensate therein in the direction of the arrows. The pump is driven by any suitable means capable of being adapted for automatic control, such as a motor 25.

Valves 21 and 22 are thus located at the inlet and outlet terminals respectively of the circulating loop 20. Valve 21 is further connected to tanks 14 and 18 by outlet conduits 26 and 27, respectively, while valve 22 in a similar manner is connected with tank 18 and reservoir 19 by inlet conduits 28 and 29 respectively. The inlet conduit 28 terminates in tank 18 preferably in the form of a nozzle 30 for reasons which will hereinafter appear.

Selector valve 21 operates to connect the inlet end of the loop 20 separately with either the outlet conduit 26 of tank 14 or the outlet conduit 27 of tank 18, while selector valve 22 operates to connect the outlet end of the loop separately with either the inlet conduit 28 of tank 18 or the inlet conduit 29 of reservoir 19.

In the present example, valves 21 and 22 are similar to valve 8, being operated by levers 31 and 32 respectively. In the positions shown, which are their normal or circulating positions, the levers are raised and connection is made wholly between storage tank 18 and the circulating loop, the ends of conduits 26 and 29 being closed. The alternate connection provided by either one of the valves is effected by moving its lever downwardly from the position shown until the openings in its cylindrical member come into proper registration with the conduit ends, this requiring in the valves shown substantially a 90 degree rotation.

For valve 21 this effects a connection between conduit 26 and the inlet end of the loop, while the end of conduit 27 is then closed, and for valve 22 this effects a connection between conduit 29 and the delivery end of the loop, while the end of conduit 28 is then closed.

It will be noted that the valve 22 is so constructed that this last connection is not effected and the normal connection is maintained until the valve is moved nearly to the full limit of its 90 degree travel. The purpose of this arrangement will appear hereinafter. It will be appreciated that, as in the case of valve 8, other valve means which provide the same arrangement of connections may be substituted for those shown.

In accordance with the invention, valve 8, controlling the flow of heating medium, and valves 21 and 22, controlling the flow of condensate, together with the circulating pump 24, are preferably placed under automatic control in dependency on the rate of flow and heating of the condensate. In the present example, valves 8 and 21 are controlled by a float 33 in storage tank 18, valve 22 is indirectly controlled by the temperature of the heated condensate and pump 24 is controlled by a float 34 in the collecting tank 14 in dependency on the quantity of condensate collected.

Referring to the control means for valves 8 and 21, the float 33 is shown at its maximum raised position when tank 18 is full, the water or condensate level being indicated at 35. Connected with the float 33 by a suitably pivoted lever 36 and a sliding connecting rod 37 is a switch comprising a forked arm 38 provided with a contact blade 39 and a stop pin 40 and contact 41 for the blade.

The arm is pivoted at 42 and is moved to carry the blade 39 between the stop pin 40 and the contact 41 by a finger 43 carried at the free end of the rod 37. The finger 43 moves between the ends of the forked arm as the float moves with the condensate level and serves to close and open the switch, that is, to move the blade 39 into and out of connection with the contact 41, when the float reaches predetermined limits in its travel.

By this arrangement the switch is closed when the condensate level reaches a certain low limit and is opened when said level reaches a certain high limit, such as that indicated. The sliding connecting rod is provided with a suitable guide bearing 44 and is pivoted to the float lever by a pin and slot connection 45 which permits the lever to move in an arc while the rod moves in substantially a straight line.

The switch is connected in one leg of a circuit 46 between a pair of solenoids 47 and 48 connected in said circuit and a source of energy, such as mains 49, to which the terminals of the circuit are connected. Solenoids 47 and 48 are positioned adjacent valves 21 and 8 respectively and represent any suitable means for operating said valves under control of a switch or similar means. In the present example, the solenoids are connected in shunt with circuit 46, but may be connected in series if desirable, depending upon the voltage of mains 49, the chief requirement of the arrangement being that both are energized by the closing of the switch and that both are deenergized when the switch is open.

The solenoids 47 and 48 are provided with the usual movable plunger cores 50 and 51 respectively which are cooperatively connected with their respective valve levers 31 and 12. The weight of plunger 51 is such that it holds the valve 8 in the normal position shown and is moved upwardly when the solenoid is energized to carry the lever 12 to the alternate position, providing connection between exhaust conduit 7 and the conduit 11 and closing the end of conduit 10. Upon deenergizing the solenoids, the valve is returned to the position shown, by the weight of the plunger 51.

Valve 21 is held in the normal position shown by a spring 52 connected with lever 31. Against the action of said spring, the lever 31 is moved to the alternate position when the solenoid 47 is energized, the plunger 50 being arranged to be drawn downwardly to move the lever in this direction. This effects a connection between outlet conduit 26 of collecting tank 14 and the inlet end of the circulating loop 20 and closes the end of conduit 27 as has been explained hereinbefore. When the solenoid is deenergized, the valve is returned by the spring 52 to the normal position shown.

The above described connection between float 33 and valves 8 and 21 whereby said float controls said valves is only by way of example and may be carried out by other means.

The control means for valve 22, hereinbefore mentioned, in accordance with the invention, is made responsive to the temperature of the condensate, which is heated in passing through the heating coil 23 in preheater 9 as will be described more fully hereinafter, and causes the valve 22 to be moved from the position shown to its alternate position when the condensate has reached a certain predetermined high temperature.

As the temperature of the condensate passing through the heating coil 23 increases, the back pressure on the auxiliary turbine supplying heating steam to the preheater will be increased correspondingly because the condensation temperature is correspondingly increased by said increasing condensate temperature. Thus the pressure existing in the preheater, which is the back pressure on the auxiliary turbine may be utilized as a convenient measure of the temperature of the condensate to which to make the valve 22 responsive.

In the present example, therefore, for the sake of simplicity in illustrating the invention, the valve 22 is made directly responsive to the pressure in the preheater, that is, to the back pressure and thus indirectly responsive to the temperature of the heated condensate. It should be understood, however, that the valve 22 may, for example, be made directly responsive to the temperature of the heating medium in the preheater or of the heated condensate.

In making valve 22 responsive to the pressure in the preheater, the lever 32 is for example connected with a piston or movable abutment 53 contained in a pressure cylinder 54. The connection between the piston and the lever is made by a rod 55 extending from the piston and pivotally connected with the lever by a pin and slot connection 56 which, with the rod 55, represents any suitable arrangement, permitting the valve to be actuated by movement of the piston.

With the valve in the position shown, the lever 32 is in its extreme raised position. In this position the piston is at the end of its upward stroke, but is separated from the upper end of the cylinder sufficiently to provide a pressure space above said piston to which the interior of the preheater 9 is connected by a pressure line or conduit 57.

By this arrangement the pressure in the preheater tends to move the piston downwardly and to thus move the valve 22 to its alternate position wherein it connects the outlet end of the loop 20 with the inlet conduit 29 of reservoir 19 and closes the end of conduit 28, as hereinbefore explained.

The pressure exerted above the piston is resisted by a spring 58 compressed between the piston and the lower end of the cylinder. The spring is adjusted to move the piston to the position shown when the pressure in the preheater 9 falls to a certain low value, that is, when the auxiliary turbine supplying to the preheater a certain normal amount of heating steam, cold condensate is passed through the heating coil 23, and to yield and permit the piston to be moved by increasing pressure above said low value until, when the said pressure reaches a certain high value corresponding to the desired condensate temperature, the piston will have moved the valve fully to its alternate position.

An opening 59 is provided in the lower end of the cylinder to admit atmospheric pressure thereto below the piston and to permit free action of the piston. The preheater 9 is provided with a drain outlet conduit 60 which leads to any suitable receiving means.

Considering now the control means hereinbefore mentioned, for the circulating pump 24, the float 34 in tank 14 is carried on one end of a suitably pivoted lever 61, which at its other end is connected with a control means for motor 25 whereby the control means is actuated as the float follows the condensate level indicated at 62.

In the present example the control means is a simple switch comprising an insulated contact blade 63 carried on the free end of the lever 61 and a pair of parallel arc-shaped contacts 64 with which the blade 63 is carried into and out of contact by movement of the float as it follows the condensate level. The length of the contacts 64 and their relation with the blade 63 is such that the switch remains closed, that is the blade bridges the contacts, while the condensate level remains above a certain low minimum. When the condensate level falls below said minimum, the blade 63 is carried out of engagement with the contacts 64 and the switch is opened.

The switch is inserted in one leg of a supply circuit 65 which connects the motor with a suitable source of energy such as the mains 49, connection to the switch being made with contacts 64. The motor is thus energized and operates the pump while the condensate level in tank 14 is above a certain low limit and is deenergized and stopped only when said level falls below this limit.

In connection with the delivery reservoir 19, a motor driven delivery pump 66 is shown connected therewith by an outlet conduit 67. The pump serves to deliver the heated condensate from the reservoir to an outlet conduit line 68 connected with it. This outlet line may lead to any point of utilization for the condensate, such as a boiler for example, in which case pump 66 may be a boiler feed pump.

Considering now the operation of the system and assuming storage tank 18 to be filled with cold condensate as indicated, the turbines and pumps to be in operation and the valves to be in the positions shown, heating steam is supplied to the preheater through valve 8 from the auxiliary turbine, while cold condensate from condenser 4 is delivered to collecting tank 14 through condensate line 15 by condensate pump 16, whereby said tank is gradually filled as indicated.

The cold condensate in storage tank 18 is taken therefrom through outlet conduit 27 and valve 21 by circulating pump 24 and passed through circulating loop 20 in a continuous stream, returning to tank 18 through valve 22 and the inlet conduit 28.

The condensate is thus continuously withdrawn from tank 18, heated in passing through heating coil 23 in the preheater and returned to tank 18. By thus coming into thermal contact with the heating medium in preheater 9 at a high rate of speed, a more rapid and effective heat transmission is effected. By this means the condensate stored in tank 18 is heated in its totality by continuous circulation through the heating means. Uniform heating of all portions of the condensate body in tank 18 is insured by the nozzle 30 which causes the returning condensate to enter therein in the form of a jet, thereby agitating said condensate body and effecting a thorough mixing with the cooler condensate.

As the condensate is raised to higher and higher temperatures by continuous circulation through the preheater 9, the condensation temperature and pressure is continually raised in the preheater. The pressure is transmitted to the movable abutment 53 through pressure conduit 57 and causes the valve 22 to be moved to its alternate position wherein it closes the end of inlet conduit 28 to tank 18 and connects the outlet end of the loop 20 with the inlet conduit 29 to reservoir 19.

The construction of the valve 22 is such that the connection shown is maintained as it is moved by the abutment 53 in response to the increasing pressure in preheater 9 until said pressure reaches a value corresponding to the desired preheat or temperature of the condensate when the valve provides said alternate connection, and instead of being returned to tank 18 in the circulatory path, the heated condensate is then delivered to reservoir 19 and is ready for utilization.

It will be seen that circulating pump 24 in addition to providing in circulation of the condensate during heating, also serves to remove the heated condensate from storage tank 18 and deliver it to the reservoir 19, delivery being effected over practically the same course as the circulation and heating.

As storage tank 18 empties, float 33 falls and when said tank is substantially empty, causes the switch connected with it to close, thereby energizing solenoids 47 and 48, whereupon valves 8 and 21 are moved to their alternate positions. This causes the heating medium to be diverted from the preheater 9 to a low pressure stage of the main turbine through conduit 11 and at the same time closes the outlet from storage tank 18 and connects the inlet end of loop 20 with the outlet conduit 26 of the collecting tank.

Circulating pump 24 then serves in a third and new capacity to draw cold condensate from the collecting tank 14 and delivers the same through the loop 20 to valve 22. On passing through the loop 20 the cold condensate passes through the heating coil and the presence of cold condensate in the heating coil 23 causes the pressure in the preheater to drop to a low value. The pressure on the abutment 53 will thus be relieved and the spring 50 will move the valve once more to the position shown wherein the delivery end of the loop is connected with inlet conduit 28 of storage tank 18. The cold condensate from collecting tank 14 will thus be delivered through valve 22 to storage tank 18.

In this manner storage tank 18 is refilled with cold condensate and when the condensate level reaches the predetermined height at which the tank is full, the float 33 is moved to the position shown and opens the switch. This deenergizes solenoids 47 and 48 whereupon the weight of plunger 51 moves valve 8 to the normal position shown and spring 52 returns valve 21 to its normal position, also as shown. The heating, delivery and intake processes above described are then automatically repeated.

It will be seen that, since cold condensate is passed through the preheater immediately upon completion of the heating, the valve 8 may be eliminated in certain cases and the exhaust from the auxiliary turbine may be permitted to flow continually to the preheater. Under this condition the temperature of the cold condensate is sufficiently low to effect a lowering of the pressure to cause the valve 22 to leave the alternate position and reconnect the circulating loop with the inlet of storage tank 18 when said condensate is passed through the preheater in filling tank 18.

In case the collecting tank 14 becomes empty while storage tank 18 is being filled because of insufficient supply of condensate in the former tank, unnecessary operation of pump 24 is eliminated by the float 34 opening the switch means controlling said pump. Operation of the pump and the filling of tank 18 is again resumed when sufficient condensate is collected to cause the float 34 to close the switch means.

In the present example, the auxiliary turbine is operated to supply heating medium for the preheater, from an intermediate stage of the main prime mover without throttling means whereby it operates between the available initial pressure and the back pressure in the preheater. The turbine thus operates with a constantly increasing back pressure and consequently with a constantly decreasing drop in heat as the condensation temperature within the preheater increases with the increased temperature of the condensate being heated. Thus the regenerative process of heating of the condensate is realized, the heating being carried out at the highest point of efficiency since the condensation temperature varies directly with the condensate temperature and differs therefrom only by the unavoidable temperature drop necessary for the heat transmission.

The heating of the condensate may be carried out in any suitable preheating means and while the condensate and heating medium are mechanically separated in a closed heater in the present example, it should be understood that the heating may be effected by a mixture as described in my application hereinbefore referred to.

Where the auxiliary turbine is not required to carry a constant load as was assumed in the present example, it will be seen that the load on said turbine may be adjusted in accordance with the load on the plant to supply heating medium during periods of low load, thereby providing load compensation. The auxiliary turbine would then preferably receive live steam for its operation.

From the foregoing it will be seen that the present embodiment may be modified to meet special requirements in power plants having widely different conditions to meet in the preheating of condensate.

It will be noted, however, that in accordance with the invention the condensate which is collected by suitable means from any convenient or desirable source or sources is automatically taken from the point of collection and delivered to a storage means periodically in certain quantities, and is then automatically circulated between the storage means and an external heating means, in which the heating is carried out at a high point in efficiency, the condensation temperature in the heater varying directly with the condensate temperature and differing therefrom only by the unavoidable temperature drop necessary for the heat transmission and the heating being greatly increased in its effectiveness by the circulation.

The stored condensate is heated in its totality by the circulation and is then automatically delivered, when heated to the required temperature, to a receiving means or reservoir. The means, preferably a pump which delivers the condensate to the storage means is made to circulate the condensate while being heated, and to deliver the heated condensate to the reservoir through the medium of simple conduit connection and valves.

What I claim as new and desire to secure by Letters Patent of the United States is:

1. The method of heating condensate in a power plant, which method comprises continuously collecting said condensate and periodically storing a portion of said collected condensate apart from that which is collecting, circulating said stored condensate in thermal contact with exhaust heating steam until said condensate is heated to a desired temperature in its totality by said circulation, and delivering said heated condensate to a reservoir.

2. In a power plant, the combination with a back-pressure turbine and a condenser, of a preheater connected with the exhaust of said turbine to receive heating medium therefrom, a collecting tank connected with the condenser to receive condensate therefrom, a condensate storage tank, a receiving reservoir, means for filling the storage tank with condensate from the collecting tank, means providing a circulating conduit connection between the storage tank and the preheater wherein the condensate from the storage tank is circulated through the preheater and means for diverting the heated condensate while in circulation from the storage tank to the reservoir.

3. In a power plant, the combination with a back-pressure turbine and a condenser, of a preheater connected with the exhaust of said turbine to receive heating medium therefrom, a collecting tank connected with the condenser to receive condensate therefrom, a condensate storage tank, a receiving reservoir, a condensate circulating conduit in the form of a loop which passes through the preheater, said conduit having an inlet end and an outlet end, a condensate circulating pump connected in said conduit providing circulation therein in the direction of the outlet end thereof, valve means connected with the inlet end of the conduit providing alternate connection with the collecting tank and the storage tank, and a second valve means connected with the outlet end of the conduit providing alternate connection with the storage tank and the receiving reservoir.

4. In a power plant, the combination with a back-pressure turbine and a condenser, of a preheater connected with the exhaust of said turbine to receive heating medium therefrom, a collecting tank connected with the condenser to receive condensate therefrom, a condensate storage tank, a receiving reservoir, a condensate circulating conduit in the form of a loop which passes through the preheater, said conduit having an inlet end and an outlet end, a condensate circulating pump connected in said conduit providing circulation therein in the direction of the outlet end thereof, valve means connected with the inlet end of the conduit providing alternate connection with the collecting tank and the storage tank, a second valve means connected with the outlet end of the conduit providing alternate connection with the storage tank and the receiving reservoir, float controlled means for operating said first-named valve means in dependency upon the condensate level in the storage tank, and means connected with the preheater for operating the second-named valve means in dependency upon the back pressure on the turbine.

5. In a power plant comprising a back-pressure turbine and a condenser which condenser provides a continuous supply of condensate, the combination of means for continuously collecting said condensate, a storage tank, means for periodically delivering the collected condensate to the storage tank, and means connected with the storage tank for circulating said stored condensate in thermal contact with heating medium from the back-pressure turbine.

6. In a power plant comprising a back-pressure turbine and a condenser, the combination of a storage tank wherein condensate from the condenser is stored, means connected therewith for circulating said stored condensate in thermal contact with heating medium from the back-pressure turbine exteriorly of and through the storage tank, said means comprising a preheater connected with the exhaust end of the back-pressure turbine, a condensate circulating conduit having an inlet and an outlet end connected with the storage tank, which conduit passes through the preheater, and pump means in said conduit for circulating the condensate therethrough.

7. In a power plant comprising a back-pressure turbine, a preheater supplied with heating medium therefrom, a condenser, a condensate collecting tank supplied with condensate therefrom, a condensate storage tank and a condensate reservoir, the method of heating the condensate which is characterized by the fact that the condensate is passed in a circulatory course through the preheater and the storage tank by pump means and that the pump means which circulates the condensate through the preheater is utilized to deliver condensate from the collecting tank to the storage tank and from the storage tank to the reservoir.

In witness whereof, I have hereunto set my hand this 8th day of January, 1925.

THEODOR STEIN.